United States Patent
Canini et al.

(10) Patent No.: US 11,714,979 B2
(45) Date of Patent: *Aug. 1, 2023

(54) DATA READER WITH HYBRID AUTOFOCUS SYSTEM

(71) Applicant: Datalogic IP Tech S.r.l., Lippo di Calderara di Reno (IT)

(72) Inventors: Federico Canini, Zola Predosa (IT); Kurt Vonmetz, Bologna (IT); Davide Bruni, Bologna (IT)

(73) Assignee: Datalogic IP Tech S.R.L., Lippo di Calderara di Reno (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,810

(22) Filed: Nov. 2, 2018

(65) Prior Publication Data
US 2019/0073503 A1     Mar. 7, 2019

Related U.S. Application Data

(63) Continuation of application No. 15/354,247, filed on Nov. 17, 2016, now Pat. No. 10,146,975.

(51) Int. Cl.
  *G06K 7/10* (2006.01)
  *G06K 7/14* (2006.01)
(52) U.S. Cl.
  CPC ...... *G06K 7/10811* (2013.01); *G06K 7/10722* (2013.01); *G06K 7/10831* (2013.01); *G06K 7/1465* (2013.01)
(58) Field of Classification Search
  USPC .................................. 235/435, 439, 454, 462
  See application file for complete search history.

(56) References Cited

U.S. PATENT DOCUMENTS

| | | | |
|---|---|---|---|
| 4,958,920 | A | 9/1990 | Jorgens et al. |
| 5,378,883 | A | 1/1995 | Batterman et al. |
| 5,646,614 | A | 7/1997 | Abersfelder et al. |
| 6,864,474 | B2 | 3/2005 | Misawa |
| 7,025,272 | B2 | 4/2006 | Yavid et al. |
| 7,469,098 | B2 | 12/2008 | Ito |

(Continued)

FOREIGN PATENT DOCUMENTS

CN        203561785        4/2014

OTHER PUBLICATIONS

International Searching Authority European Patent Office, International Search Report and Written Opinion, PCT/IB2017/057119, dated Jan. 30, 2018, 12 pp.

*Primary Examiner* — Matthew Mikels
(74) *Attorney, Agent, or Firm* — Stoel Rives LLP

(57) ABSTRACT

The present disclosure relates to data readers including an improved imaging system that optimizes active and passive autofocus techniques for improving data reading functions. In an example, the data reader initially uses active autofocus techniques to focus a lens system based on a measurement reading by a rangefinder and acquire an image of an item in the field-of-view of the data reader. The data reader includes a decoding engine operable to decode an optical code of the item using the acquired image. If the decoding engine is unable to decode the optical code using the active autofocus technique, the data reader alternates to a passive autofocus technique to alter the focus settings of the lens system and reattempt the decoding process.

18 Claims, 3 Drawing Sheets

(56) References Cited

U.S. PATENT DOCUMENTS

| | | | |
|---|---|---|---|
| 7,609,958 B2 | 10/2009 | Border et al. | |
| 7,643,745 B2 | 1/2010 | Richards | |
| 8,988,590 B2 | 3/2015 | Gillet et al. | |
| 9,224,022 B2 | 12/2015 | Ackley et al. | |
| 10,146,975 B2 * | 12/2018 | Canini | G06K 7/10811 |
| 2004/0118926 A1 * | 6/2004 | Yavid | G06K 7/0008 |
| | | | 235/462.23 |
| 2004/0159703 A1 * | 8/2004 | Kogan | G02B 7/04 |
| | | | 235/454 |
| 2005/0103866 A1 * | 5/2005 | Zhu | G06K 7/10851 |
| | | | 235/462.45 |
| 2005/0218231 A1 * | 10/2005 | Massieu | G06K 7/10801 |
| | | | 235/472.01 |
| 2006/0008265 A1 | 1/2006 | Ito | |
| 2008/0031610 A1 | 2/2008 | Border et al. | |
| 2008/0245872 A1 | 10/2008 | Good | |
| 2008/0277477 A1 | 11/2008 | Thuries et al. | |
| 2011/0290886 A1 | 12/2011 | Carlson | |
| 2013/0057753 A1 | 3/2013 | Gillet et al. | |
| 2014/0038646 A1 | 2/2014 | Francheteau | |
| 2015/0310243 A1 * | 10/2015 | Ackley | G02B 26/0875 |
| | | | 235/462.24 |

\* cited by examiner

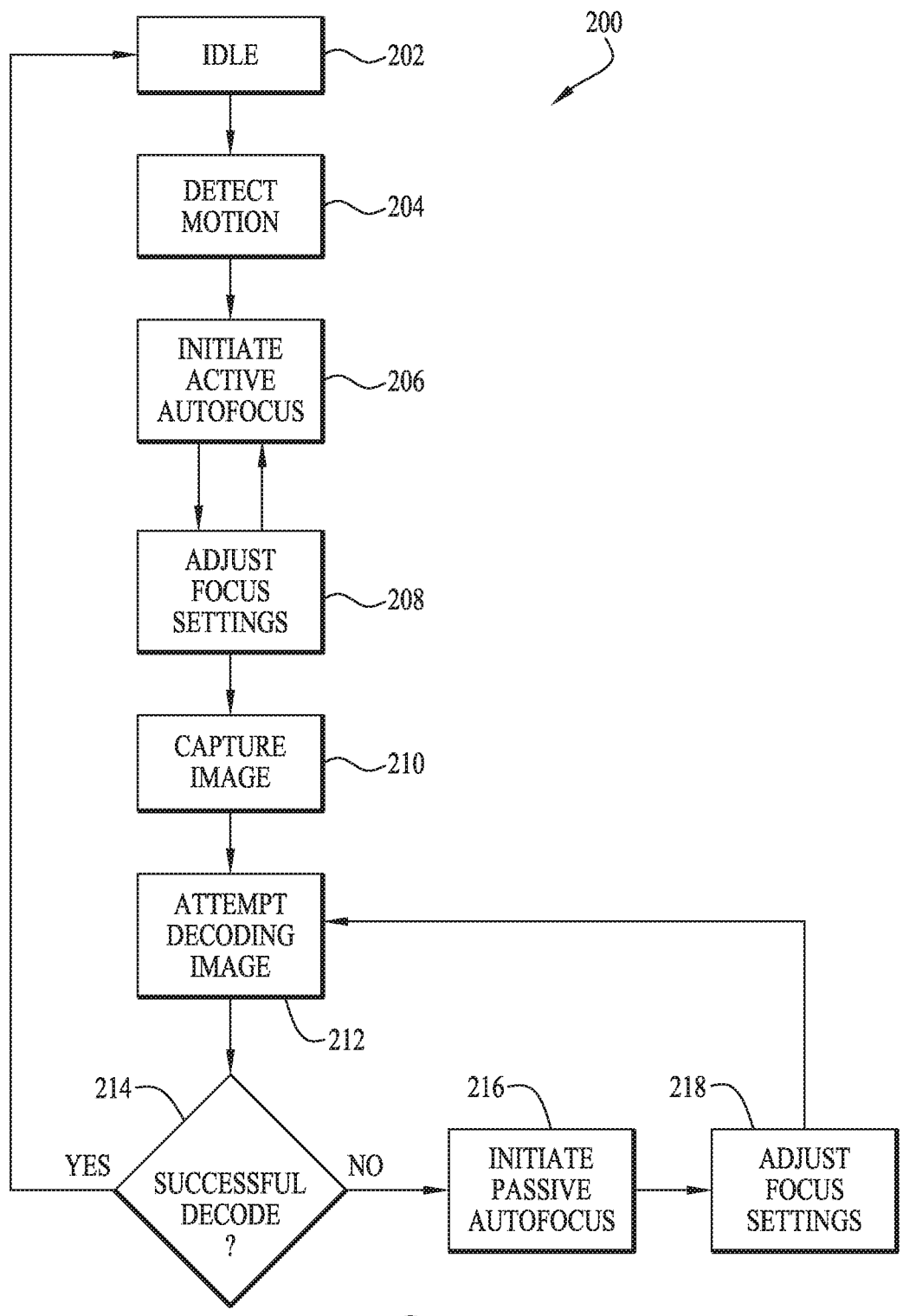

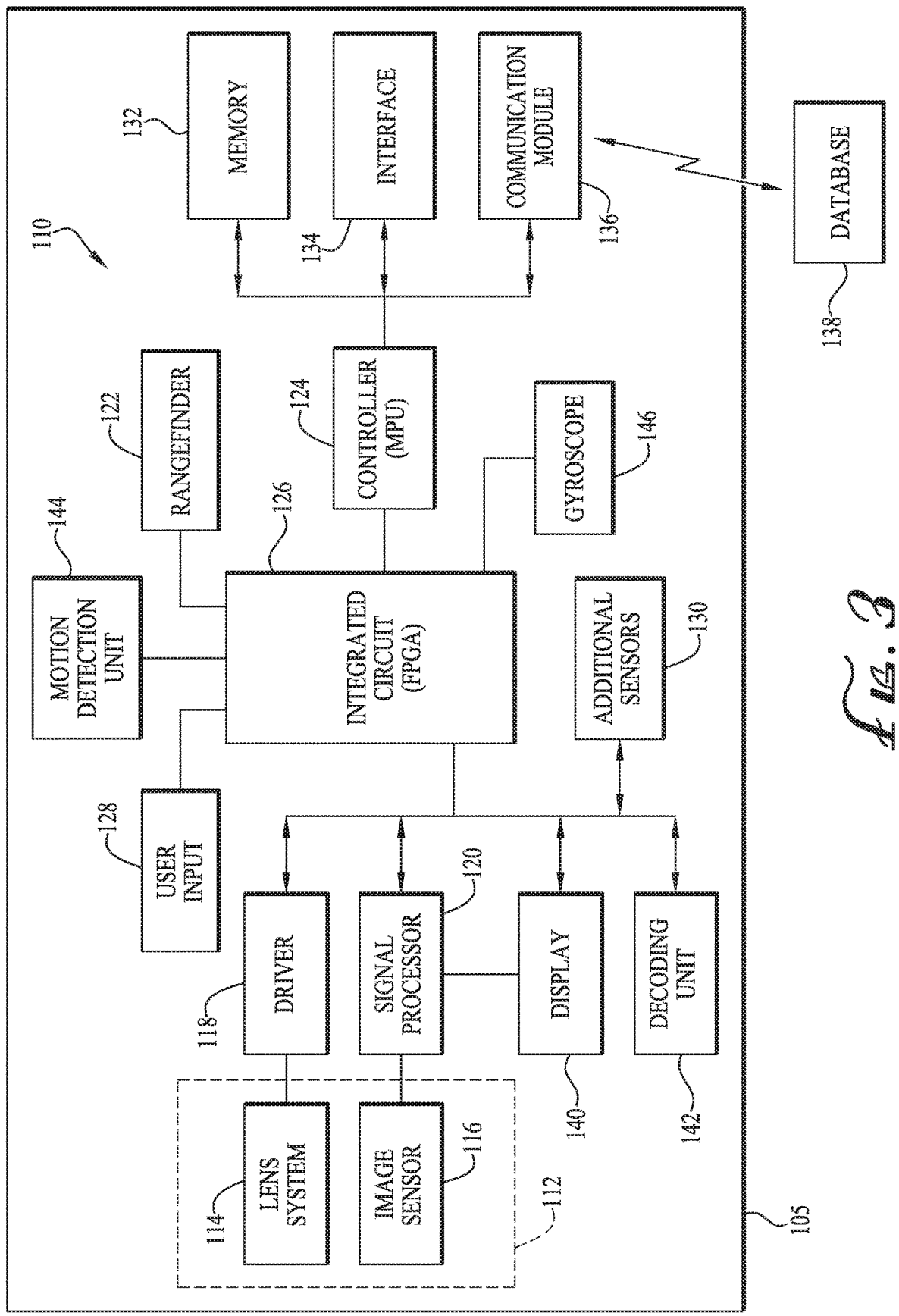

DATA READER WITH HYBRID AUTOFOCUS SYSTEM

RELATED APPLICATIONS DATA

This application is a continuation of and claims the benefit under 35 U.S.C. § 120 of U.S. patent application Ser. No. 15/354,247 filed Nov. 17, 2016, the disclosure of which is incorporated by reference herein in its entirety.

BACKGROUND

The field of the disclosure relates generally to data readers, and in particular, to hybrid autofocus systems for data readers operable to optimize active and passive autofocus techniques for improving data reading functions.

Generally, an autofocus optical system uses one or more sensors, control systems, and a motor to focus a selected point or region. Autofocus systems used with electronic devices, such as cameras and data readers, may be separated into two general classes—active autofocus systems and passive autofocus systems. Active autofocus systems measure distance to the target item independently of the optical system, and subsequently adjust the optical system for correct focus. These systems may measure distance in a variety of ways, such as by using rangefinders to emit ultrasonic sound waves and measuring the delay in their reflection, or by using infrared light to triangulate the distance to the object/item.

Passive autofocus systems, on the other hand, determine correct focus by performing passive analysis of the image that is entering the optical system, instead of using sound waves or otherwise directing energy toward the item. Passive autofocusing may use a variety of techniques for analyzing the image, such as phase detection or contrast detection. Phase detection may be achieved by dividing the incoming light into pairs of images and comparing the images to each other. Contrast detection autofocus may be achieved by measuring contrast through the lens within a sensor field, and comparing the intensity difference between adjacent pixels to correct image focus.

Typically, active autofocus systems provide a fast distance measurement and are able to focus the electronic device in a shorter period of time as compared to a passive autofocus system. However, active autofocus systems tend to be less precise than passive autofocus systems, especially when the field-of-view includes multiple moving items located at varying distances from the device. Some electronic devices have sought to address these inherent weaknesses by using a hybrid autofocus system that combines active and passive autofocus techniques. However, the inventors have found that these prior hybrid systems fail to provide optimal performance in data-reading environments that typically have multiple moving items in the field-of-view of the device. In addition, many modern autofocus camera systems are based on phase detection technology that requires costly and specialized image sensors equipped with specific phase-detection pixels.

Accordingly, the present inventors have recognized a need for an improved hybrid autofocus system for data readers that combines both active autofocus and passive autofocus techniques to provide an optimized data reader capable of handling complex fields-of-view and operating in a data-reading environment. In addition, the present inventors have recognized a need for such an improved hybrid autofocus system operable without reliance on phase detection technology. Additional aspects and advantages will be apparent from the following detailed description of example embodiments, which proceeds with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 2 is a flow chart illustrating a method of data reading using the imaging system of FIG. 1.

FIG. 3 is a block diagram of an imaging system for a data reader in accordance with another embodiment.

DETAILED DESCRIPTION OF EXAMPLE EMBODIMENTS

Figure 1:
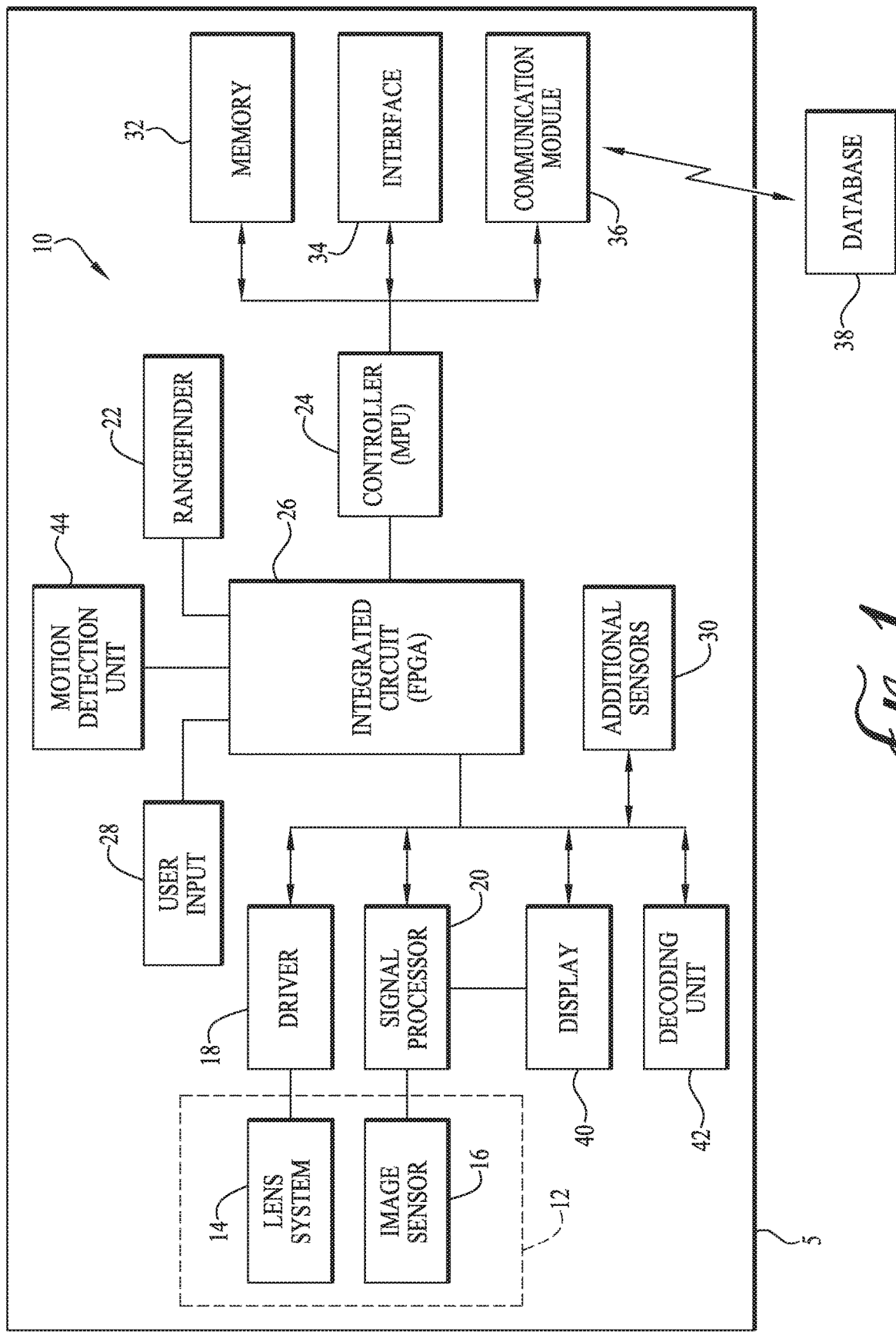
FIG. 1 is a block diagram of an imaging system for a data reader in accordance with one embodiment.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Certain embodiments may be capable of achieving various advantages, which may include one or more of the following: (1) providing an electronic device with a hybrid autofocus system including both passive and active autofocus capabilities for quickly and easily focusing the electronic device and reading optical codes from items/objects within a field-of-view of the device; (2) providing an electronic device with motion-activation capabilities to activate the autofocus system in advance of an image-acquisition event to minimize time to focus; (3) providing an electronic device with motion-activation capabilities for early activation of an automatic exposure control (AEC) system and/or an automatic gain control (AGC) system to improve performance of the data reader; and (4) providing an electronic device with robust focus capabilities for improved data reading in environments with multiple items/objects located at multiple distances.

Collectively, FIGS. 1-3 illustrate embodiments and features of a data reader 5 (or data reader 105) that may be used to capture optical codes, such as barcodes or other machine-readable indicia, in a variety of applications. For example, optical codes can be used in a retail setting to identify a class of items/objects (e.g., merchandise) or in the healthcare field to identify patient records and files, or in a business setting to identify unique items (e.g., patents). As a result, optical codes are found on a wide variety of items, such as retail goods, company assets, and documents. As is further described in detail below with reference to the figures, a data reader 5, 105 may include an imaging system 10, 110 that uses hybrid autofocus system employing active autofocus techniques to optimize time-to-focus capabilities of the data reader 5, 105 along with passive autofocus techniques to provide robust focus control for the data reader 5, 105 when reading multiple items at multiple distances in the field-of-view of the data reader 5, 105. Additional details of these and other embodiments of the data reader 5, 105 are described herein with reference to the figures.

FIG. 1 is a block diagram of an imaging system 10 for a data reader 5 in accordance with one embodiment. With particular reference to FIG. 1, the following description provides details of the various components of the imaging system 10 and their interoperability with other components to achieve the improved performance of the data reader 5. With reference to FIG. 2, the description relates to a method of data reading using the imaging system of FIG. 1 and its improved hybrid autofocus system.

With reference to FIG. 1, the imaging system 10 includes imaging optics 12 that may comprise a lens system 14 and an image sensor 16. Briefly, in operation, light from the field-of-view is focused via the lens system 14 to form on the image sensor 16 an image of the item or other item located in the field-of-view. The image sensor 16 may comprise any one of a variety of suitable image sensors, such as a complementary metal-oxide semiconductor (CMOS) sensor, a charge-coupled device (CCD), or any other suitable sensor. In some embodiments, the image sensor 16 operates at a frame rate of about 52-60 frames per second (fps). In other embodiments, the image sensor 16 may operate at higher frame rates, such as, but not limited to, 120 fps.

The lens system 14 may include one or more lens elements suitable for focusing light on the image sensor 16. The lens system 14 may include any one of a variety of suitable lenses, including curved lenses and liquid lenses. In some embodiments, the lens system 14 is automatically adjustable to a variety of focus settings. For example, the lens system 14 may be a variable zoom lens including one or more mobile lens elements that may be driven by a driver 18 to control the focal length and the focus position of the lens system 14. In some embodiments, the imaging system 10 includes a signal processor 20 in operable communication with the driver 18, where the signal processor 20 generates and transmits signals (e.g., signals received from an integrated circuit 26 or controller 24) to the driver 18 for adjusting the focal length and/or focal position of the lens system 14. In some embodiments, the driver 18 is operable to move the lens system 14 up to about 3.0 mm at an accuracy on lens positioning of about 5 µm to 10 µm to accurately adjust the focus from 15 cm to 1500 cm or more (based on the distance range of the rangefinder 22 as further discussed below). Additional details relating to systems for communicating adjustment signals to the driver 18 via the signal processor 20 are described in further detail below with particular reference to FIG. 2.

When the image sensor 16 acquires an image, the signal processor 20 may transform the image into a digital image. The image may comprise one or more still images of a target item in the field-of-view, a stream of moving images or video segments, or other suitable images. In some embodiments, the signal processor 20 may apply any one of a variety of suitable processing techniques, such as contrast, color, and exposure balancing, compression, and interpolation, to the image to improve quality as needed for subsequent decoding by a decoding engine 42. In other embodiments, the signal processor 20 may be adapted to process the images to "digitally zoom" the images so that the image appears as if it were captured under different zoom settings of the lens system 14. This technique may be used to provide electronically controllable zoom functions for images captured using a fixed focus lens system, a manual focus system, and/or adjustable focus systems.

After the image of the target item has been acquired by the image sensor 16, the signal processor 20 may transmit the image to the decoding engine 42 for decoding the optical code on the item. The decoding engine 42 may be including any suitable reading system operable to decode an optical code. The decoding engine 42 may be configured with decoding parameters and filters as desired. In some embodiments, the decoding parameters and filters may include one or more of the following: instructions for length of time to spend on decoding labels (e.g., 1D or 2D labels), instructions for reading data of a specific length, instructions for minimum and maximum acceptable length for 1D and 2D labels, parameters relating to label prefix and postfix, and/or decoding aggressiveness. It should be understood that in various embodiments of the data reader 5, these decoding instructions may vary for different decoding engines 42 based on, for instance, the characteristics of the target environment for which the data reader 5 will be used.

Images, videos, and/or other data captured by the imaging system 10 may be stored on the data reader 5 in a memory module 32. Memory module 32 can include any one of a variety of suitable devices, such as RAM and non-volatile flash or ROM devices, secure digital (SD) cards, solid state, magnetic, optical, or other suitable data storage devices. In some embodiments, memory 32 may be fixed within the imaging system 10 or may be removable. In some embodiments, the data reader 5 may include an interface 34, such as a memory slot, for accommodating removable memory devices, such as memory sticks, cards, or other removable memory devices. The data reader 5 may further include a communication module 36 to facilitate communication with a server/database 38, or any other suitable external systems, such as an electronic device, mobile phone, or a computer. The communication module 36 may facilitate wired or wireless communication with other devices over a short distance (e.g., Bluetooth™) or nearly unlimited distances (e.g., via the Internet).

The data reader 5 further includes a rangefinder 22 adapted for determining a distance from the data reader 5 (or imaging system 10) to a target item within the field-of-view of the data reader 5. In some embodiments, the data reader 5 is operable to read and decode optical codes on a target item located within 15 cm and up to 1500 cm of the data reader 5. As mentioned previously, the distance to the item as determined by the rangefinder 22 may be used to adjust the focus on the lens system 14. For example, the rangefinder 22 may be in operable communication with the signal processor 20 (such as through the integrated circuit 26) to communicate the distance measurement. Upon receiving the measurement, the signal processor 20 may convert that range measurement and determine an appropriate focal adjustment based on calibration calculations or factors. Thereafter, the signal processor 20 transmits signals to the driver 18 to adjust the lens system 14 as needed. Additional details relating to calibration factors and autofocusing techniques via the rangefinder 22 are described in further detail below with particular reference to FIG. 2.

The rangefinder 22 may be any suitable rangefinder operable for reading a distance to a target item as described previously. In addition, the rangefinder 22 is preferably operable for use as a multi-spot focus determination system to accurately track multiple items that may be at different distances from the data reader 5 and/or to track items that may be moving. In multi-spot focus determination, the field-of-view may be divided into several focal spots or areas, where the imaging system 10 determines an optimal focal setting for each of the spots. These focal settings may be stored in a memory 32 and called as needed to focus the lens system 14. For example, when the target item is identified in one of the focal spots based on the measurement from the rangefinder 22, the focal settings for that focal spot may be used by the imaging system 10 to quickly focus the lens system 14. In some embodiments, a feedback system may be established between the motor 18 and the signal processor 20 (or other component of the imaging system 10) to fine-tune the adjustment of the lens system 14 as needed.

In some embodiments, the rangefinder 22 may include an integrated time-of-flight (ToF) camera for improved performance. ToF cameras are range-imaging cameras that resolve distance measurements based on the known speed of light, measuring the time-of-flight of a light signal between the camera and the target item for each point of the image. The ToF camera is a class of scannerless LIDAR, in which the entire scene is captured with each laser or light pulse. These systems typically cover distance ranges of a few centimeters up to several kilometers with a distance resolution of about 1 cm, and generally operate very quickly, providing up to 160 images per second. Some example ToF devices that may be used in conjunction with data reader 5 include the VL6180X and VL53L0X devices manufactured by STMicroelectronics of Coppell, Tex.

The data reader 5 may include additional sensors 30 in communication with the imaging system 10. In some embodiments, the sensors 30 may include light sensors that measure illumination levels to determine whether additional light sources may need to be activated on the data reader 5 to provide sufficient lighting for accurately capturing an image of the item, or audio sensors that may be useful in capturing video images, or biometric sensors for incorporating security measures and/or for personalizing the data reader 5 for individual users.

Operation of the imaging system 10 is controlled primarily via a controller 24 that is in communication with an integrated circuit 26. In some embodiments, the controller 24 may be any of various suitable commercially available processors or other logic machine capable of executing instructions. The controller 24 may include suitable dual microprocessors or other multi-processor architectures may also be employed. The integrated circuit 26 may be a field-programmable gate array (FPGA) that may be programmed with instructions for operating the imaging system 10. For example, in some embodiments, the integrated circuit 26 may include: (a) instructions for formatting videos and images acquired via the image sensor 16; (b) instructions for operating the hybrid autofocus engine; (c) instructions for operating the decoding engine 42; (c) instructions for operating the driver 18; (d) illumination control for the data reader 5; (e) aiming control and other features of the rangefinder 22; (f) flat-field correction or other image processing techniques to improve the quality of the images acquired via the image sensor 16; (g) control of voltage level translators for resolving voltage compatibility issues of the data reader; and (h) hardware acceleration information to improve performance and efficiency of the data reader 5.

As illustrated in FIG. 1, the controller 24 and integrated circuit 26 are in operable communication with the lens system 14, image sensor 16, driver/motor 18, and the signal processor 20, among other components, and together control operation of the components of the imaging system 10. In some embodiments, controller 24 (and/or integrated circuit 26) cooperates with a user input system 28 to allow a user to use the data reader 5 and interact with the imaging system 10. The user input system 28 may be any suitable device, such as a button or trigger, that is actuatable or otherwise operable by the user to initiate or activate the image sensor 16. In other embodiments, the user input system 28 may be a touch screen system, or voice-recognition system, joystick, or other suitable input system.

The data reader 5 may further include a display 40 that is in operable communication with the signal processor 20, controller 24, and/or integrated circuit 26 for displaying one or more images or videos acquired by the image sensor 16. In such embodiments, the user may be able to view the image of the target item and provide instructions to the controller 24 (such as instructions to reacquire the image, delete the image, save the image, etc.) via the user input 28 if desired. Display 40 may comprise a liquid crystal display (LCD), organic light-emitting display (OLED), or any other suitable display screen.

In other embodiments, the display 40 may present other information to the user. For example, the display 40 may be used to allow the user to establish modes of operation of the data reader 5, select performance features of the imaging system 10, enter control settings, enter user identification information and/or passwords, and receive/provide instructions to the user.

The imaging system 10 further includes a motion detection unit 44 in communication with the integrated circuit 26 and/or the controller 24. The motion detection unit 44 may be any suitable system operable to detect a motion of the data reader 5, such as whether the data reader 5 has been rotated, tilted, or shaken. In some embodiments, the motion detection unit 44 may be a tilt sensor or accelerometer or a rangefinder with background suppression capabilities. In other embodiments, the motion detection unit 44 may be an image analysis system operable to analyze the image acquired by the image sensor 16 and determine whether the data reader 5 is in motion. In some embodiments, the motion detection unit 44 may be in communication with or electronically coupled to the display 40 such that when the motion detection unit 44 is activated (e.g., the data reader 5 is rotated), the display 40 presents a message notifying the user that the motion detection unit 44 has been activated.

It should be understood that while the description may refer to certain components being in operable communication with other components, in some embodiments, such components may be directly connected to one another, and in other embodiments, the components may be in operable communication through a third component. For example, in some embodiments, the user input 28, the motion detection unit 44, and/or the rangefinder 22 may be directly connected to the signal processor or microcontroller 24, thereby skipping the connection to the integrated circuit 26.

FIG. 2 is a flow chart illustrating a method 200 of data reading using the imaging system 10 and its hybrid autofocusing techniques for improved data reading. With reference to FIG. 2, the data reader 5 is initially at an idle state at step 202 and waiting for an activation trigger. In some embodiments, the data reader 5 may be in a sleep mode to conserve power until activated. In other embodiments, when the data reader 5 is idle, the controller 24 may instead set the lens system 14 to a predetermined first focus setting which can be, for example, a midpoint position of the adjustable range of the lens system 14 to expedite ensuing adjustments. In other embodiments, controller 24 may automatically select other focus distance settings, such as retaining the last focus setting that was used before the data reader returned to an idle state, or setting the focus settings to a commonly used focal setting of the data reader 5. In still other embodiments, the user may be able to program default focus settings via the user input 28.

While the data reader 5 is idle at step 202, the motion detection unit 44 is active and operable to detect movement of the data reader 5. When motion of the data reader 5 is detected at step 204 via the motion detection unit 44, the active autofocus technique (steps 206-208) is initiated at step 206. When active autofocus is activated at step 206, the rangefinder 22 measures a distance to the target(s) in the field-of-view and communicates that measurement to the controller 24 and/or integrated circuit 26, which in turn communicates to the driver 18 an adjustment amount for the lens system 14 depending on the measured distance. The adjustment amount for the lens system 14 may be determined using any one of a variety of suitable calibration techniques.

In one embodiment, prior to using the data reader 5 for decoding optical codes, the user may first calibrate the data reader 5. The calibration process may begin with acquiring a calibration image of the field-of-view of the data reader 5. The signal processor 20 (or other component of the imaging system 10, such as the controller 24) may analyze the calibration image and identify one or more particular items in the image that have an optimum focus setting. Such focus setting may be determined in a variety of ways, such as by examining clarity, contrast, or by using other known image processing techniques. For example, the calibration image may include a few items in the near-field, an item in the mid-field, and a few other items in the far-field. After the calibration image is acquired, the signal processor 20 may determine that the item in the mid-field has the best focus settings, e.g., the item appears with the best clarity and contrast. Thereafter, the rangefinder 22 may be used to measure a calibration focus distance from the data reader 5 to the location of the item in the mid-field found to have the optimum focus setting. Using the calibration focus distance and the focus distance setting used to capture the initial calibration image, the signal processor 20 determines a focus correlation factor that may be used to associate rangefinder distance values with different focus settings for the lens system 14. This calibration process may be repeated numerous times for different distances to create a focus correlation factor for various rangefinder distance values. In some embodiments, a look-up table may be created and stored, such as in memory 32 to facilitate the process. In other embodiments, the calibration data may be used to create a mathematical expression to correlate distance values and focus settings.

Using the determined correlation factor, at step 208, the controller 24 transmits an adjustment signal to the driver 18 to adjust the lens element 14 and focus settings based on the rangefinder distance. In some embodiments, such as when the controller 24 does not detect triggering of an activation mechanism or button (e.g., the user input 28) to initiate the image sensor 16, the rangefinder 22 may continue measuring a distance to the target item and adjusting the lens element 14 in a feedback loop as needed. When the activation mechanism is triggered and detected by the controller 24, at step 210, an image of the field-of-view and target item is captured via the image sensor 16. In the case of a simple field-of-view with one optical code/item present, the time to focus the lens element 14 may be in the range of 20 ms to 40 ms.

At step 212, the decoding engine 42 analyzes the acquired image and attempts to decode any optical codes present in the image. In some embodiments, prior to step 212, the signal processor 20 and/or controller 26 may optimize the image using known imaging techniques to digitally improve the image and the likelihood of a successful decoding. At step 214, if the decoding is successful, the data reader 5 returns back to an idle state (step 202) for a subsequent reading of another item. If the decoding is not successful, then the method 200 initiates the passive autofocus technique (steps 216-218 and step 212).

At step 216, the signal processor 20 (and/or the integrated circuit 26 or controller 26, other suitable component of the imaging system 10) analyzes the set of images acquired by the image sensor 16 and employs a contrast detection technique (as discussed previously) to identify in each image one or more focal planes, each focal plane corresponding to a target item at a different distance, i.e., a set of optical configurations, in the image(s) that are most likely associated with target items and/or optical labels at different distances in the field-of-view based on contrast measurements. In some embodiments, the signal processor 20 (or the integrated circuit 26) may perform the passive autofocus technique in real-time capturing video streaming from the image sensor 16. In the case where multiple target items are located in the field-of-view at different distances, the average time to focus may be in the range of 150 ms to 200 ms.

For each set of identified optical configurations in the image, driver 18 adjusts the focus settings of the lens system 14 at step 218 to a second focus setting and/or detects multiple focus planes. Thereafter, returning to step 212, the decoding engine 42 attempts to decode the optical code. Steps 216, 218, and 212 may be repeated for each potential good optical configuration identified via the contrast detection method, and the process may stop when the decoding engine 42 successfully decodes the optical code in the second image, or when no more optical configurations are available for decoding. If the passive autofocus technique yields a successful decoding, then the data reader 5 may return to an idle step (step 202) for a subsequent reading of a different item.

In some embodiments, steps 216, 218, and 212 may be continuously repeated until a successful decoding of the optical code occurs. In other embodiments, the method 200 may continue for a predetermined number of cycles or attempts, and then notify the user, such as via the display 40, that the decoding attempt has failed. In such embodiments, the user may then reinitiate the data reading process 200.

In other embodiments, steps 202 and 204 may be eliminated, and the data reader 5 may instead continuously measure the distance to a target item in the field-of-view via the rangefinder 22, while awaiting detection of the activation trigger. This embodiment may not optimize power consumption because the rangefinder 22 may be continuously operating. However, this configuration may result in faster focus times since the lens system 14 will be adjusted continuously based on the measurements from the rangefinder 22, such that the lens system 14 may be in the proper setting or may be close to the proper setting when the trigger for acquiring an image is activated.

As described in the foregoing description, the method 200 is able to use both active autofocus techniques (via the rangefinder 22) and passive autofocus techniques (via the integrated circuit 26 and signal processor 20) to attempt to decode an optical label on an item in the field-of-view of the data reader 5. In the case where the active autofocus technique fails to decode the optical code, the system alternates to the passive autofocus technique and attempts to decode the optical code again. In addition, in some embodiments, the active autofocus technique may be triggered in advance of a user request to acquire an image, thereby accelerating the time to focus of the lens system 14 and improving data reader performance.

FIG. 3 illustrates another embodiment of a data reader 105 with an imaging system 110. The imaging system 110 may be include the same or substantially similar components as the data reader 5. Accordingly, to avoid unnecessarily repeating the description for structure and function of certain components, reference numbers in the 100-series having the same final two digits as those in FIG. 1 are used in FIG. 3 to identify analogous structures. For example, it should be understood that controller 124 as described with reference to FIG. 3 may be identical to and capable of carrying out the same instructions and protocols as processor 24 of FIG. 1. Accordingly, some detail of these structures may not be further described to avoid obscuring more pertinent aspects of the embodiments.

With reference to FIG. 3, the imaging system 110 may further include a gyroscope 146 in operable communication with the integrated circuit 126 (and/or controller 124) to provide a more robust autofocus system for the data reader 105. The gyroscope 146 may be operable to measure an inclination of the data reader 105. Based on the inclination of the data reader 105, the imaging system 110 (such as via the integrated circuit 126 or controller 124) may be configured to estimate whether the user is aiming the data reader 105 for scanning an optical code/label in a near field-of-view (e.g., the data reader 105 may be tilted at a downward angle indicating the item is close to the position of the data reader) or whether the user is aiming in the far-field or mid-field (e.g., the data reader 105 may be tilted at an upward angle or be horizontally posed indicating the item is farther away from the position of the data reader). In such embodiments, the angular measurement readings by the gyroscope 146 for near-field and far-field readings may be associated with particular adjustment ranges for the lens element 114 to expedite time to focus of the data reader 105.

For example, if the gyroscope 146 detects that the data reader 105 is tilted downwardly from a horizontal aiming axis between an angular range of 15 to 90 degrees, then the lens system 14 may be adjusted to a setting falling within a first focal setting range corresponding to an item positioned in the near-field. If the gyroscope 146 detects that the data reader 105 is tilted at an angle from 0-15 degrees either upwardly or downwardly from the horizontal aiming axis, then the lens system 14 may be adjusted to a setting falling within a second focal corresponding to an item positioned in the mid-field or far-field.

In some embodiments, the imaging systems 10, 110 may further include a time delay prior to adjusting the focus setting of the lens element 14, 114 and acquiring an image to ensure that the data reader 5, 105 is properly stabilized. For example, in some embodiments, the motion detection unit 44 and/or the gyroscope 146 may determine a movement speed of the data reader 5, 105. If the speed is greater than a predetermined threshold, the imaging systems 10, 110 may delay any adjustments of the lens element 14, 114 until the speed threshold is satisfied (e.g., until the data reader 5, 105 is stable and aimed at the target). This time delay may optimize the data reader 5, 105 and avoid unnecessary calculations while the user is aiming the data reader 5, 105 at the target. Once the data reader 5, 105 is stable (e.g., not moving), then the data reader 5, 105 may be used as described in FIGS. 2 and 3.

In other embodiments, the imaging systems 10, 110 may be adaptive and learn to associate certain adjustment and focus settings with higher rates of successful decoding over extended use of the data reader 5, 105. Accordingly, the imaging systems 10, 110 may optimize performance of the data reader 5, 105 by adjusting the data reader 5, 105 to the focus settings that have higher success rates to improve time to focus and data reading time. For example, in settings where the data reader 5, 105 is used mostly for near-field reading, such as in a grocery or other retail setting, the imaging systems 10, 110 may automatically set the focus of the lens system 14, 114 to an optimum focus for near-field reading and expect that the focus would be proper for most reading scenarios, thereby reducing the time to focus. The imaging systems 10, 110 may make fine adjustments to the focus settings from time to time, such as when the rangefinder 22 determines that the item being read is located in the far-field. But otherwise, the focus settings may be mostly unchanged. In such scenarios, the user may program the data reader 5, 105, such as via the user input system 28, for use in the near-field so that the imaging system 10, 110 adapts to the use and expects any focal settings to be essentially fine-tune adjustments from a base setting.

In other embodiments, the data readers 5, 105 may include biometric sensors or other identification features (e.g., a login/password screen on the display 40) to associate the data reader 5, 105 with specific users. In such embodiments, performance of the data reader 5, 105 may be adapted to recognize and account for individual user tendencies that may be based on a user's specific handling of the data reader 5, 105. For example, the data reader 5, 105 may learn the user's specific handling and aiming habits of the data reader 5, 105, and associate specific adjustment and focus settings tuned for each user to yield higher rates of successful decoding. Alternately, the data reader 5, 105 may learn that a specific user primarily uses the data reader 5, 105 for near-field reading and another user uses the data reader 5, 105 exclusively for far-field reading. Once a user logs in or is otherwise identified by the data reader 5, 105, the imaging system 10, 110 may call up the specific user's settings, such as via memory 32 or via the communication module 36, to optimize the data reader 5, 105. Accordingly, the data reader 5, 105 may be optimized for a variety of users despite the different ways that individual users handle the data readers 5, 105.

It is intended that subject matter disclosed in any one portion herein can be combined with the subject matter of one or more other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reader, comprising:
an optical system including:
   a variable focus lens system configured to be adjusted according to one or more focus settings including at least one of a focal length or a focal position of the variable focus lens system;
   an image sensor configured to acquire images of an item in a field-of-view of the data reader;
a decoder configured to perform decoding of an optical code associated with the item;

a hybrid autofocus system including a rangefinder, and a signal processor operably coupled to the image sensor, the hybrid autofocus system configured to operate the variable focus lens system for image capture by the image sensor in either a passive autofocus mode or an active autofocus mode that determine the focus settings used to adjust the variable focus lens system; and a controller operably coupled to the variable focus lens system, the image sensor, the decoder, and the hybrid autofocus system, wherein the controller is configured to control the variable focus lens system to automatically switch between the active autofocus mode and the passive autofocus mode responsive to results of the decoding including:
- automatically switching operation of the variable focus lens system from the active autofocus mode to the passive autofocus mode responsive to the decoder unsuccessfully decoding the optical code during the active autofocus mode; and
- automatically switching operation of the variable focus lens system from the passive autofocus mode to the active autofocus mode responsive to the decoder successfully decoding the optical code during the passive autofocus mode, wherein the active autofocus mode uses the rangefinder to determine a distance to the item independently of the optical system for determining the focus settings for the hybrid focus system, and the passive autofocus mode uses the signal processor, and not the rangefinder, to perform a passive analysis of the acquired image for determining the focus settings for the hybrid focus system, and wherein the focus settings are continually adjusted in one of the passive autofocus mode or the active autofocus mode, during which the focus settings are adapted based on individual user tendencies for a specific known user's handling of the data reader.

2. The data reader of claim 1, wherein the controller is configured to control operation of the data reader to enter an idle state before entering the active autofocus mode, and wherein the idle state is neither the passive autofocus mode nor the active autofocus mode.

3. The data reader of claim 2, wherein the controller is configured to control operation of the data reader to exit the idle state and enter the active autofocus mode responsive to detecting motion of the data reader prior to detecting an activation trigger from a user input to acquire an image.

4. The data reader of claim 3, further comprising a motion detection unit configured to determine motion by detecting at least one of a rotation, a tilt, or a shaking of the data reader.

5. The data reader of claim 3, wherein the controller is configured to determine motion of the data reader responsive to analyzing the images acquired by the image sensor.

6. The data reader of claim 1, wherein the controller is configured to:
- remain in the active autofocus mode responsive to the decoder successfully decoding the optical code during the active autofocus mode; and
- remain in the passive autofocus mode responsive to the decoder unsuccessfully decoding the optical code during the passive autofocus mode.

7. The data reader of claim 6, wherein the controller is configured to notify the user that the decoding has failed responsive after a predetermined number of decoding attempts have been unsuccessful.

8. A method for operating a data reader, the method comprising:
- adjusting, via a driver, a variable focus lens system of an optical system according to one or more focus settings including at least one of a focal length or a focal position of the variable focus lens system;
- acquiring, via an image sensor of the optical system, images of an item in a field-of-view of the data reader using a selected focus setting;
- decoding, via a decoder, an optical code associated with the item from the images acquired by the image sensor;
- operating the variable focus lens system for image capture by the image sensor in either a passive autofocus mode or an active autofocus mode that determine the one or more focus setting used to adjust the variable focus lens system, including:
  - during the active autofocus mode, determining the one or more focus settings for the variable focus lens system based on distance of the item determined by a rangefinder of a hybrid autofocus system independently of the optical system; and
  - during the passive autofocus mode, determining the one or more focus settings based on a passive analysis of the acquired image by a signal processor operably coupled to the image sensor of the hybrid autofocus system, and not the rangefinder;
- controlling, via a controller, the variable focus lens system to automatically switch from the active autofocus mode to the passive autofocus mode responsive to results of the decoding including determining the optical code is non-decodable during the active autofocus mode;
- controlling, via the controller, the variable focus lens system to automatically switch from the passive autofocus mode to the active autofocus mode responsive to the decoder successfully decoding the optical code during the passive autofocus mode; and
- at least one of a motion detection unit or a gyroscope determining a movement speed of the data reader and delaying adjustments of the variable focus lens system based on a speed threshold being satisfied.

9. The method of claim 8, wherein determining the focus settings for the variable focus lens system during the active autofocus mode includes measuring, via the rangefinder operating during the active autofocus mode, a distance between the data reader and the item in a field-of-view of the data reader, and further comprising adjusting, via the driver, the selected focus settings of the variable focus lens system of the data reader based, at least in part, on the distance measured by the rangefinder during the active autofocus mode.

10. The method of claim 8, further comprising receiving, via a controller, an output signal from the decoder indicating whether the optical code in the image is decodable or non-decodable.

11. The method of claim 8, wherein determining the focus settings for the variable focus lens system during the passive autofocus mode includes determining, via the controller, contrast measurements for the at least two images acquired by the image sensor during the passive autofocus mode.

12. The method of claim 11, wherein determining the focus settings for the variable focus lens system during the passive autofocus mode further includes identifying, via the controller, in each of the at least two images one or more focal planes based on the determined contrast measurements, each of the one or more focal planes corresponding to a focus position of the variable focus lens system.

13. The method of claim 12, further comprising adjusting, via the driver, the variable focus lens system to the focus position corresponding with at least one of the one or more focal planes.

14. The method of claim 9, further comprising detecting, via a motion detection unit, a motion of the data reader, wherein the rangefinder measures the distance between the data reader and the item responsive to the motion detection unit detecting a motion of the data reader.

15. The method of claim 8, wherein adjusting step further includes adjusting the focus setting of the variable focus lens system based in part on the inclination angle measured by a gyroscope of the data reader.

16. The data reader of claim 3, wherein the controller is configured to adjust the variable focus lens system to a predetermined first focus setting when entering the active autofocus mode.

17. The data reader of claim 1, wherein the predetermined first focus setting is based on either a last focus setting from before entering the idle state or a focal setting determined by historical usage of the data reader.

18. A method for operating a data reader, the method comprising:
 adjusting, via a driver, a variable focus lens system of an optical system according to one or more focus settings including at least one of a focal length or a focal position of the variable focus lens system;
 acquiring, via an image sensor of the optical system, images of an item in a field-of-view of the data reader using a selected focus setting;
 decoding, via a decoder, an optical code associated with the item from the images acquired by the image sensor;
 operating the variable focus lens system for image capture by the image sensor in either a passive autofocus mode or an active autofocus mode that determine the one or more focus setting used to adjust the variable focus lens system, including:
  during the active autofocus mode, determining the one or more focus settings for the variable focus lens system based on distance of the item determined by a rangefinder of a hybrid autofocus system independently of the optical system; and
  during the passive autofocus mode, determining the one or more focus settings based on a passive analysis of the acquired image by a signal processor operably coupled to the image sensor of the hybrid autofocus system, and not the rangefinder;
 controlling, via a controller, the variable focus lens system to automatically switch from the active autofocus mode to the passive autofocus mode responsive to results of the decoding including determining the optical code is non-decodable during the active autofocus mode; and
 controlling, via the controller, the variable focus lens system to automatically switch from the passive autofocus mode to the active autofocus mode responsive to the decoder successfully decoding the optical code during the passive autofocus mode,
wherein adjusting the focus setting includes:
 adjusting the focus setting of the variable focus lens system based in part on the inclination angle measured by a gyroscope of the data reader;
 adjusting the focus setting to a first focus setting associated with a near field responsive to the gyroscope detecting the data reader being tilted within a first angular range from a horizontal aiming axis; and
 adjusting the focus setting to a second focus setting associated with a far field responsive to the gyroscope detecting the data reader being tilted within a first angular range from a horizontal aiming axis.

* * * * *